Patented Apr. 7, 1942

2,278,954

UNITED STATES PATENT OFFICE 2,278,954

COATING AGGREGATE WITH BITUMEN

Robert R. Thurston, Chappaqua, N. Y., assignor, by mesne assignments, to The Texas Company, New York, N. Y., a corporation of Delaware No Drawing. Application October 5, 1940, Serial No. 359,979

8 Claims. (Cl. 106—275)

This invention relates to the coating of various kinds of mineral aggregate with bitumen without drying, and especially to the coating of those types of mineral aggregate which have heretofore been considered incapable of being satisfactorily coated by conventional methods.

It is known that certain wet mineral aggregates, such as metallurgical slag, granites, Massachusetts rhyolite, etc., are extremely difficult to coat with bituminous materials. If the aggregate is dried before mixing with the bituminous materials, less difficulty may be experienced in coating the aggregate; but such aggregates containing substantial proportions of water do not coat satisfactorily, and drying is comparatively expensive and is to be avoided if possible. Moreover, even when a coating of bituminous material is formed by expensive preliminary treatments, such as drying, the bituminous material is not strongly bound to the difficulty-coated aggregate, and the bituminous material is more or less readily stripped from the aggregate by the action of water.

It is an object of this invention to provide a method of coating mineral aggregates whereby the aggregate is effectively coated and a firm bond is formed between the aggregate and the bituminous material without drying the aggregate. This object is accomplished by a simple and inexpensive pretreatment of the aggregate with a dilute aqueous solution of certain surface-active substances. Pretreatment of the aggregate with surface-active substances is not broadly novel, but I have found that materially better results may be obtained by utilizing certain sulphonated surface-active substances which have not previously been suggested. In particular, I have found that surface-active substances of the type disclosed as emulsifying agents for asphalt in my Patent No. 2,130,326, September 13, 1938, have the property of aiding the formation of extremely resistant bituminous coatings on mineral aggregates which are coated with difficulty by ordinary methods. These emulsifying agents are prepared by sulphonating a mixture of 90–60% of a petroleum hydrocarbon, such as a petroleum distillate lubricating oil or a solvent extract of petroleum lubricating oil, and 10–40% of an aromatic hydrocarbon, such as benzol, toluol, diphenyl, etc. Certain solvent extracts, such as Edeleanu extracts, may contain sufficient aromatic hydrocarbons so that addition of aromatic hydrocarbons is unnecessary, or the proportion of aromatic hydrocarbons in the solvent extract may be adjusted to 10–40% by any means.

The above mixtures of petroleum hydrocarbons and aromatic hydrocarbons are sulphonated by heating with 98% sulphuric acid or with other known sulphonating agents, adding water to the sulphonated material to stratify, and neutralizing the separated layer containing the desired sulphonated material with an alkaline material, such as an alkali metal base. For a more complete description of the sulphonated materials and their process of manufacture, reference is made to the above-mentioned Patent No. 2,130,326, and the disclosure of said patent is hereby made a part of this disclosure. The exact chemical structure of the sulphonated materials has not been definitely established, but it is known that there is a chemical combination of the petroleum hydrocarbon and the aromatic hydrocarbon in the sulphonation process. I therefore term the reaction product a petroleum hydrocarbon-aromatic sulphonic acid, and wherever this term is used in this specification it is to be interpreted to be limited to the sulphonated material as described herein and in the above-mentioned patent.

According to this invention, mineral aggregates, and especially difficulty-coated aggregates, such as blast furnace slag, Massachusetts rhyolite, etc., are treated with a sufficient amount of dilute solution of an alkali metal salt, preferably the sodium salt, of the petroleum hydrocarbon-aromatic sulphonic acids to wet the surface of the aggregate, as a preliminary step in the coating of the aggegate with bituminous materials. The concentration of the solution of the alkali-metal salt of petroleum hydrocarbon-aromatic sulphonic acids is ordinarily about 0.5–5.0%, but it is to be understood that smaller or larger proportions may be used in certain instances, depending upon the particular aggregate to be treated and the proportion of water contained in the aggregate. Ordinarily, one ton of the treated aggregate should contain about 5–40 pounds of the dilute solution of emulsifier in order that the surfaces of the aggregate are completely wetted by the solution.

If the bituminous material is to be contacted with the aggregate in the form of an emulsion, the emulsion is prepared, utilizing as the emulsifying agent an alkali metal salt of petroleum hydrocarbon-aromatic sulphonic acids, such as the sodium or potassium salt, according to the methods described in my Patent No. 2,130,326. The most satisfactory emulsions contain about 32–45% of water, although other proportions may be used, depending upon the fluidity desired.

Such emulsions are mixed with the treated aggregate in the desired proportions according to the usual methods which are so well known as to require no further amplification.

If the bituminous matter is contacted with the aggregate in a non-aqueous fluid form, such as melted asphalt or asphalt cut-back with naphtha and the like, a somewhat different procedure is followed.

In this modification of my invention, the aggregate may be first treated, as above described, with a dilute solution of the emulsifier (an alkali metal salt of petroleum hydrocarbon-aromatic sulphonic acids), and then the emulsifier is converted into an oil-soluble polyvalent metal salt, such as by the addition of lime or other suitable salts of calcium, such as calcium chloride. Other oil-soluble polyvalent metal salts of petroleum hydrocarbon-aromatic sulphonic acids, such as aluminum and iron salts, may be formed by adding water-soluble compounds of the desired metal. In general, any polyvalent metal which forms oil-soluble salts of the emulsifier is of utility. The proportion of lime or other metal compound which forms oil-soluble compounds of the emulsifier should be sufficient to approximately completely react with the alkali metal salt, but a small excess or deficiency of lime or other metal compound does not appear to adversely affect the product. Having coated the aggregate with a thin layer of an oil-soluble salt of petroleum hydrocarbon-aromatic sulphonic acids, the coated aggregate is mixed with melted asphalt or cut-back asphalt in the usual manner. In one instance, a damp stone which could be coated with asphalt only to the extent of 20% of its surface without pretreatment, was perfectly coated with pretreatment as above described.

As a further modification, an oil-soluble polyvalent metal salt of the petroleum hydrocarbon-aromatic sulphonic acids can be dissolved in a suitable petroleum primer, such as a naphtha, kerosene or fuel distillate, and this oil solution applied to aggregate to coat the same directly with the oil-soluble salt. The coated aggregate is then mixed with a molten bitumen or cut-back asphalt in the manner previously described. In some cases the oil-soluble polyvalent metal salt of petroleum hydrocarbon-aromatic sulphonic acids can be added in a suitable proportion of about 0.5–5.0% by weight to a molten asphalt or cut-back asphalt, and the treated asphalt applied directly to the wet aggregate which may or may not have been initially treated with a coating of the oil-soluble polyvalent metal salt solution in a petroleum primer.

It is to be understood that the present invention is applicable to the treatment of aggregate in the field during the actual road building process, or can be employed to treat aggregate in the bulk at a suitable plant, the aggregate then being transported in a loose form to the point of use. In the first instance, a layer of the stone to be treated is spread on the road surface, then a solution of the coating material is applied, while the aggregate is raked, turned over, and spread in the conventional manner, and finally liquid or molten bitumen is applied thereto, and the road finished in the usual manner. In the second instance, the aggregate is treated at a bulk plant, from where it is transported to the point of use, spread over the road bed, with the addition of further bitumen, if desired, and rolled and finished in the customary manner.

In the modifications described above, the asphalt or other bituminous material is firmly bound to the surface of the aggregate. While I do not desire to be limited by any theory, I believe that the firm bond between the aggregate and the bituminous material is dependent upon the fact that both the emulsifier and the bituminous material are of similar origin so that the bituminous material readily wets a surface coated with the emulsifier or its oil-soluble salts, and enters into some sort of physical or chemical combination with the emulsifier or its oil-soluble salts. Whatever the explanation may be, it is possible to perfectly coat aggregates by the method of this invention where prior methods failed. Samples of products of this invention have been stored and vigorously agitated in water with no appreciable loosening or stripping of the asphalt coating, while samples of products prepared by prior methods using the same aggregate were imperfectly coated, and any partial coating formed was readily stripped from the aggregate through the action of water.

According to this invention, it is preferred to mix the treated aggregate and asphalt in the proportions ordinarily used in preparing a paving material or the like. However, it is within the scope of the invention to form only thin coatings of bituminous material on the aggregate so that the aggregate is adapted for transporting in a loose form to the point of use where further bituminous material is added and the mixture is applied as in the usual road-making operations. The thin precoat overcomes the resistance to coating offered by some aggregates, and the precoated aggregate is thus converted to an aggregate which is as good as or better than those aggregates which are ordinarily considered to be easily coated.

Obviously many modifications and variations of the invention, as hereinbefore set forth, may be made without departing from the spirit and scope thereof, and therefore only such limitations should be imposed as are indicated in the appended claims.

What I claim is:

1. In a method of coating mineral aggregate, the improvement which comprises treating the aggregate with a dilute solution of an alkali metal salt of petroleum hydrocarbon-aromatic sulphonic acids prior to contacting the aggregate with bituminous material.

2. The method of coating mineral aggregate which comprises treating the aggregate with a dilute aqueous solution of an alkali metal salt of petroleum hydrocarbon-aromatic sulphonic acids, and then mixing the treated aggregate with a bituminous emulsion.

3. The method of coating mineral aggregate which comprises treating the aggregate with a dilute aqueous solution of an alkali metal salt of petroleum hydrocarbon - aromatic sulphonic acids, converting said alkali metal salt to an oil soluble polyvalent metal salt of petroleum hydrocarbon-aromatic sulphonic acids by adding a suitable polyvalent metal compound, and then mixing the treated aggregate with a fluid bitumen.

4. The method of coating mineral aggregate which comprises treating the aggregate with a sufficient amount of a 0.5–5.0% aqueous solution of the sodium salt of petroleum hydrocarbon-aromatic sulphonic acids to wet the surface of the aggregate, and then mixing the treated aggregate with a bituminous emulsion stabilized by means of a small amount of the sodium salt of petroleum hydrocarbon-aromatic sulphonic acids.

5. The method of coating mineral aggregate which comprises treating the aggregate with a sufficient amount of a 0.5–5.0% aqueous solution of the sodium salt of petroleum hydrocarbon-aromatic sulphonic acids to wet the surface of the aggregate, converting the said sodium salt of petroleum hydrocarbon-aromatic sulphonic acids to the corresponding salt of a polyvalent metal selected from the group consisting of calcium and aluminum, and mixing the treated aggregate with a bituminous material in non-aqueous fluid form.

6. The method of coating mineral aggregate which comprises applying to the aggregate a liquefied bitumen in the presence of a sufficient quantity of an oil-soluble polyvalent metal salt of petroleum hydrocarbon-aromatic sulphonic acids to strongly bond the bitumen to the aggregate.

7. The method of coating mineral aggregate which comprises treating the aggregate with a mineral oil solution of an oil-soluble polyvalent metal salt of petroleum hydrocarbon-aromatic sulphonic acids, and mixing the treated aggregate with a fluid bitumen.

8. A coated mineral aggregate comprising crushed mineral matter, the individual pieces thereof having a coating of bitumen bonded thereto by an oil-soluble polyvalent metal salt of petroleum hydrocarbon-aromatic sulphonic acids.

ROBERT R. THURSTON.